US012737908B2

(12) United States Patent
Kang et al.

(10) Patent No.: US 12,737,908 B2
(45) Date of Patent: Sep. 15, 2026

(54) METHOD AND DEVICE FOR ESTIMATING GAZE DISTANCE OF USER USING HYBRID SCHEME

(71) Applicant: KOREA INSTITUTE OF SCIENCE AND TECHNOLOGY, Seoul (KR)

(72) Inventors: Min Koo Kang, Seoul (KR); Dae Yong Cho, Seoul (KR); Tae Young Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 279 days.

(21) Appl. No.: 18/442,634

(22) Filed: Feb. 15, 2024

(65) Prior Publication Data

US 2025/0218019 A1 Jul. 3, 2025

(30) Foreign Application Priority Data

Dec. 28, 2023 (KR) ........................ 10-2023-0195622

(51) Int. Cl.

*G06K 9/00* (2022.01)
*G06T 7/593* (2017.01)
*G06T 7/60* (2017.01)
*G06T 7/73* (2017.01)

(52) U.S. Cl.

CPC ................ *G06T 7/593* (2017.01); *G06T 7/60* (2013.01); *G06T 7/73* (2017.01); *G06T 2207/10028* (2013.01); *G06T 2207/30201* (2013.01)

(58) Field of Classification Search

CPC .. G06T 7/593; G06T 7/60; G06T 7/73; G06T 2207/10028; G06T 2207/30201; G06T 7/55; G06F 3/013; G06F 3/005

See application file for complete search history.

(56) References Cited

U.S. PATENT DOCUMENTS 11,748,906 B2 * 9/2023 Lu ........................ H04N 23/698 345/419
2016/0284129 A1 * 9/2016 Nishizawa .............. G06F 3/013
2016/0323540 A1 * 11/2016 Nilsson .................. G06V 20/46
2018/0095282 A1 * 4/2018 Deng ................... G02B 27/017
2020/0183490 A1 * 6/2020 Klingström ............... G06T 7/73
2021/0248399 A1 * 8/2021 Martin .................... G06F 3/013
2021/0248766 A1 * 8/2021 Koo .......................... G06T 7/11
2025/0076974 A1 * 3/2025 Strandborg ............. G06T 15/20
2025/0139911 A1 * 5/2025 Di ........................ G06V 10/761

* cited by examiner

*Primary Examiner* — Gregory A Morse
*Assistant Examiner* — Owais I Memon
(74) *Attorney, Agent, or Firm* — NSIP Law

(57) ABSTRACT

A method and device for estimating a gaze distance of a user using hybrid scheme may accurately estimate a gaze distance of a user robustly against a difference in physiological characteristics of the user and a change in external environment using information of a binocular image and information of a depth image in a complementary manner by determining a final gaze distance of the user based on a first gaze distance of the user estimated based on a binocular convergence angle of the user and a second gaze distance of the user estimated based on a depth value of the gaze point of the user.

18 Claims, 8 Drawing Sheets

(a)

(b)

(a)

(b)

METHOD AND DEVICE FOR ESTIMATING GAZE DISTANCE OF USER USING HYBRID SCHEME

CROSS-REFERENCE TO RELATED APPLICATIONS

This application claims the benefit under 35 U.S.C. § 119(a) of Korean Patent Application No. 10-2023-0195622 filed on Dec. 28, 2023, in the Korean Intellectual Property Office, the entire disclosure of which is incorporated herein by reference for all purposes.

BACKGROUND

The present disclosure relates to a method and device for estimating a gaze distance of a user.

When various types of wearable devices, such as augmented reality (AR) glasses, provide various types of content, a gaze distance of a user is frequently required. Conventional gaze distance estimation technology may be broadly classified into technology for estimating a gaze distance of a user using a binocular convergence angle of the user and technology for estimating the gaze distance of the user using a depth camera.

When estimating the gaze distance of the user using the binocular convergence angle of the user, a scale error of a gaze distance due to human physiological characteristics such as fatigue and poor concentration, a drift phenomenon of a gaze distance due to muscles around both eyes, and an error of an estimated value of a gaze distance due to eye tremor, blinking, and failure to form a fixed gaze point may occur. When estimating a gaze distance of a user using a depth camera, there is a problem in that an error occurs in an estimated value of the gaze distance in an area where accurate depth measurement by the depth camera is difficult.

SUMMARY

An object of the present disclosure is to provide a method and device for estimating a gaze distance of a user using a hybrid technique such that the gaze distance of the user may be accurately estimated robustly against a difference in physiological characteristics of the user and a change in external environment. Objects are not limited to the technical object described above, and other technical objects may be derived from the descriptions below.

According to an aspect of the present disclosure, a method of estimating a gaze distance of a user includes detecting a gaze point of the user in a front image, which is an image of an environment in front of a field of view of the user, from a binocular image, which is an image of both eyes of the user, estimating a first gaze distance between both eyes of the user and the gaze point based on a binocular convergence angle of the user estimated from the binocular image, estimating a second gaze distance between the both eyes of the user and the gaze point based on a depth value of the gaze point of the user estimated from a depth image of the environment in front of the field of view of the user, and determining a final gaze distance between the both eyes of the user and the gaze point based on the first gaze distance and the second gaze distance.

In the estimating of the first gaze distance, the first gaze distance may be estimated by detecting an angle between a normal line of a center point of a left eye pupil and a normal line of a center point of a right eye pupil shown in the binocular image as binocular convergence of the user, and calculating a gaze distance between the both eyes of the user and the gaze point from a distance between the center point of the left eye pupil and the center point of the right eye pupil and the detected binocular convergence angle.

In the estimating of the second gaze distance, the second gaze distance may be estimated by extracting a depth value of a pixel corresponding to the detected gaze point of the user from among depth values of a plurality of pixels shown in the depth image, and determining the extracted depth value as a gaze distance between the both eyes of the user and the gaze point.

The method may further include correcting the estimated first gaze distance based on a linear correlation between the estimated first gaze distance and the estimated second gaze distance, wherein, in the determining of the final gaze distance, the final gaze distance may be determined based on the corrected first gaze distance.

In the correcting of the first gaze distance, the estimated first gaze distance may be corrected in a direction that a scale error of the first gaze distance is minimized using a linear regression model reflecting the linear correlation between the estimated first gaze distance and the estimated second gaze distance.

The method may further include detecting a pupil size of the user from the binocular image, and correcting the estimated first gaze distance based on the detected pupil size, wherein, in the determining of the final gaze distance, the final gaze distance may be determined based on the corrected first gaze distance.

The detecting of the pupil size, the detecting of the gaze point, the estimating of the first gaze distance, the estimating of the second gaze distance, and the determining of the final gaze distance may be performed repeatedly for each of a plurality of binocular images obtained by shooting both eyes of the user at multiple time points, and in the correcting of the first gaze distance, the first gaze distance may be corrected by updating the estimated first gaze distance with a value obtained by applying a weight that changes according to a change between a pupil size detected at a time point immediately before a current time point, which is a last time point among the plurality of time points, and a pupil size detected at the current time point, to the estimated first gaze distance.

In the correcting of the first gaze distance, the first gaze distance may be corrected by updating the estimated first gaze distance with a value obtained by applying the weight to a reference gaze distance, which is a gaze distance at a time point when a pupil of the user expands after shrinking, and the estimated first gaze distance.

The detecting of the gaze point of the user, the estimating of the first gaze distance, the estimating of the second gaze distance, and the determining of the final gaze distance may be performed repeatedly for each of a plurality of binocular images obtained by shooting both eyes of the user at multiple time points, and the method may further include correcting the first gaze distance estimated at a current time point which is a last time point among the multiple time points, based on a first gaze distance estimated at a time point immediately before the current time point, and in the determining the final gaze distance, the final gaze distance may be determined based on the corrected first gaze distance.

In the correcting of the first gaze distance, the first gaze distance may be corrected by updating the estimated first gaze distance with a value obtained by applying a preset weight to the first gaze distance estimated at the time point immediately before the current time point and the estimated first gaze distance.

The method may further include correcting the estimated second gaze distance based on a position of the detected gaze point, and in the determining of the final gaze distance, the final gaze distance may be determined based on the corrected second gaze distance.

In the correcting of the second gaze distance, the estimated second gaze distance may be corrected by changing a value of the second gaze distance to a value of the estimated first gaze distance according to whether the detected gaze point is located in a disocclusion area which is an area where the depth value of the gaze point of the user is not measured due to an object located between the both eyes of the user and the gaze point.

In the correcting of the second gaze distance, the estimated second gaze distance may be corrected by changing a value of the estimated second gaze distance to a value of the estimated first gaze distance according to whether the detected gaze point is located in a reflective medium area which is an area where a change in depth value of each pixel in the depth image is greater than or equal to a reference tolerance compared to a change in position of the gaze point of the user.

The detecting of the gaze point of the user, the estimating of the first gaze distance, the estimating of the second gaze distance, and the determining of the final gaze distance may be performed repeatedly for each of a plurality of binocular images obtained by shooting both eyes of the user at multiple time points, and in the correcting of the second gaze distance, the second gaze distance estimated at a current time point which is a last time point among the multiple time points may be corrected based on the second gaze distance estimated at a time point immediately before the current time point.

In the correcting of the second gaze distance, the estimated second gaze distance may be corrected by updating the estimated second gaze distance with a value obtained by applying a preset weight to the second gaze distance estimated at the time point immediately before the current time point and the second gaze distance estimated at the current time point.

In the determining of the final gaze distance, the final gaze distance may be determined based on a value calculated by applying reliability of the first gaze distance to the first gaze distance and a value calculated by applying reliability of the second gaze distance to the second gaze distance.

The reliability of the first gaze distance and the reliability of the second gaze distance may be determined according to whether the detected gaze point is located in a disocclusion area, which is an area where the depth value of the gaze point of the user is not measured due to an object located between the both eyes of the user and the gaze point, or a reflective medium area, which is an area where a change in depth value of each pixel in the depth image is greater than or equal to a reference tolerance compared to a change in position of the gaze point of the user.

The detecting of the gaze point of the user, the estimating of the first gaze distance, the estimating of the second gaze distance, and the determining of the final gaze distance may be performed repeatedly for each of a plurality of binocular images obtained by shooting both eyes of the user at multiple time points, and the reliability of the first gaze distance and the reliability of the second gaze distance may be determined according to an amount of change between the repeatedly estimated first gaze distances and an amount of change between the repeatedly estimated second gaze distances.

According to another aspect of the present disclosure, there is provided a computer-readable recording medium in which a program for performing the method of claim 1 using a computer is recorded.

According to another aspect of the present disclosure, a device for estimating a gaze distance of a user includes a gaze point detection unit configured to detect a gaze point of the user in a front image, which is an image of an environment in front of a field of view of the user, from a binocular image, which is an image of both eyes of the user, a first gaze distance estimation unit configured to estimate a first gaze distance between both eyes of the user and the gaze point based on a binocular convergence angle of the user estimated from the binocular image, a second gaze distance estimation unit configured to estimate a second gaze distance between the both eyes of the user and the gaze point based on a depth value of the gaze point of the user estimated from a depth image of the front of the field of view of the user, and a hybrid estimation unit configured to determine a final gaze distance between the both eyes of the user and the detected gaze point based on the first gaze distance and the second gaze distance.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Hereinafter, embodiments of the present disclosure will be described in detail with reference to the drawings. The embodiments of the present disclosure relate to a method and device for estimating a gaze distance of a user using a hybrid technique such that the gaze distance of the user may be accurately estimated robustly against a difference in physiological characteristics of the user and a change in external environment. Hereinafter, the method and the device will be briefly referred to respectively as a "gaze distance estimation device" and a "gaze distance estimation method".

Figure 1:
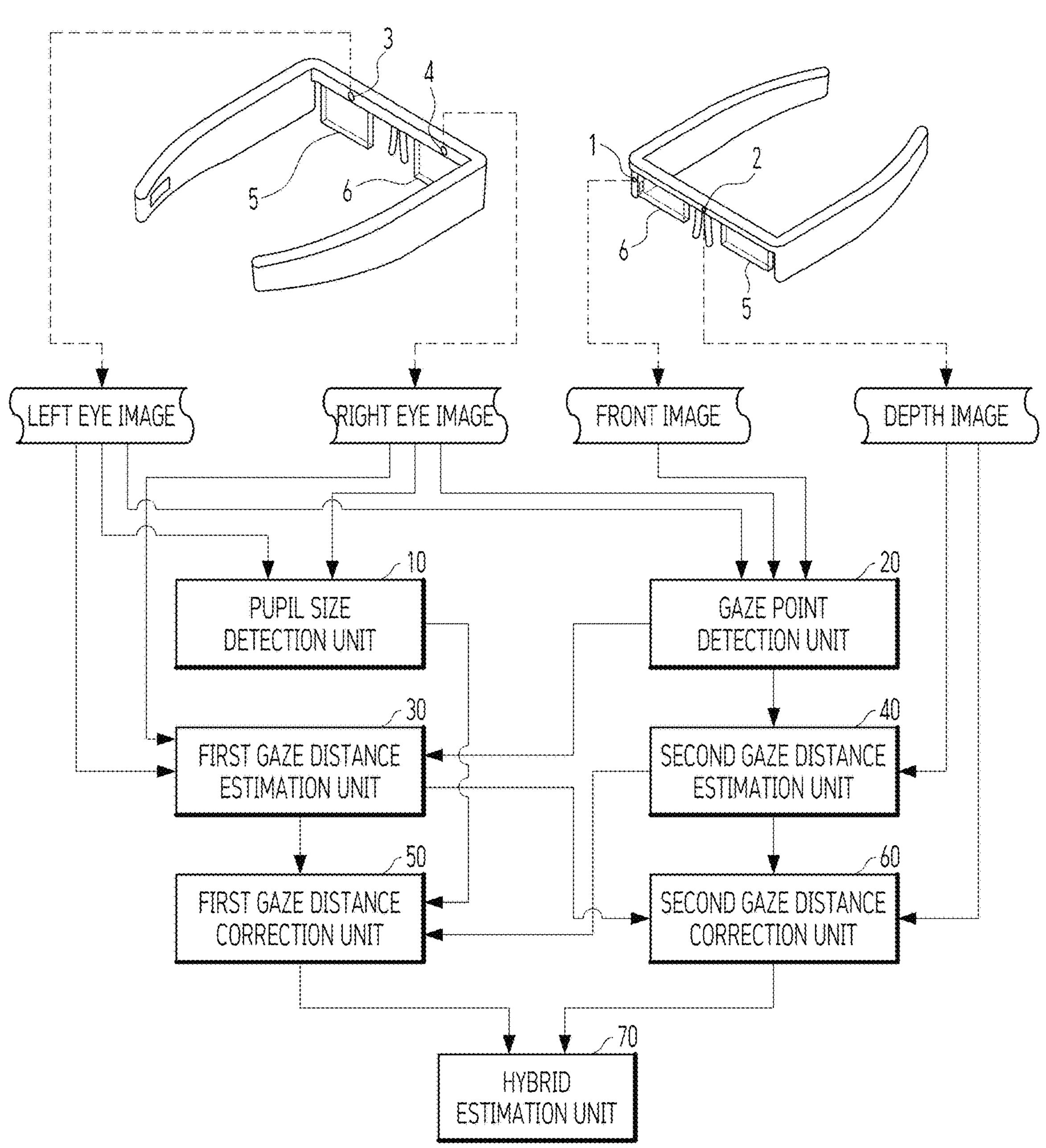
FIG. 1 is a configuration diagram of a gaze distance estimation device according to an embodiment of the present disclosure.

FIG. 1 is a configuration diagram of a gaze distance estimation device according to an embodiment of the present disclosure. Referring to FIG. 1, the gaze distance estimation device according to the present embodiment includes a pupil size detection unit 10, a gaze point detection unit 20, a first gaze distance estimation unit 30, a second gaze distance estimation unit 40, a first gaze distance correction unit 50, a second gaze distance correction unit 60, and a hybrid estimation unit 70. An upper portion of FIG. 1 illustrates an example of augmented reality (AR) glasses to which the gaze distance estimation device according to the present embodiment is applied. The AR glasses illustrated in FIG. 1 include a front camera 1, a depth camera 2, binocular cameras 3 and 4, a left display panel 5, and a right display panel 6. The gaze distance estimation device according to the present embodiment may be implemented by a combination of a processor and memory or a field programmable gate array (FPGA) and may be applied to AR glasses.

The front camera 1 shoots the environment in front of a field of view of a user that wears AR glasses, thereby generating a front image that is an image obtained by shooting the environment in front of the field of view of the user. The front image may generally be a color image, such as an RGB image, or a black and white image. The depth camera 2 generates a depth image of the environment in front of a field of view of a user by measuring a depth value of each pixel of the front image generated by the front camera 1 for the environment in front of the field of view of the user that wears AR glasses.

The binocular cameras 3 and 4 include a left eye camera 3 that shoots a left eye pupil of a user wearing AR glasses, and a right eye camera 4 that shoots a right eye pupil of the user. The left display panel 5 displays AR content for a front environment viewed through a left eye of a user. The right display panel 6 displays AR content for the front environment viewed through a right eye of a user. The left display panel 5 and right display panel 6 may display AR content using video perspective, optical perspective, or so on. Hereinafter, a user wearing AR glasses will be briefly referred to as a "user".

Figure 2:
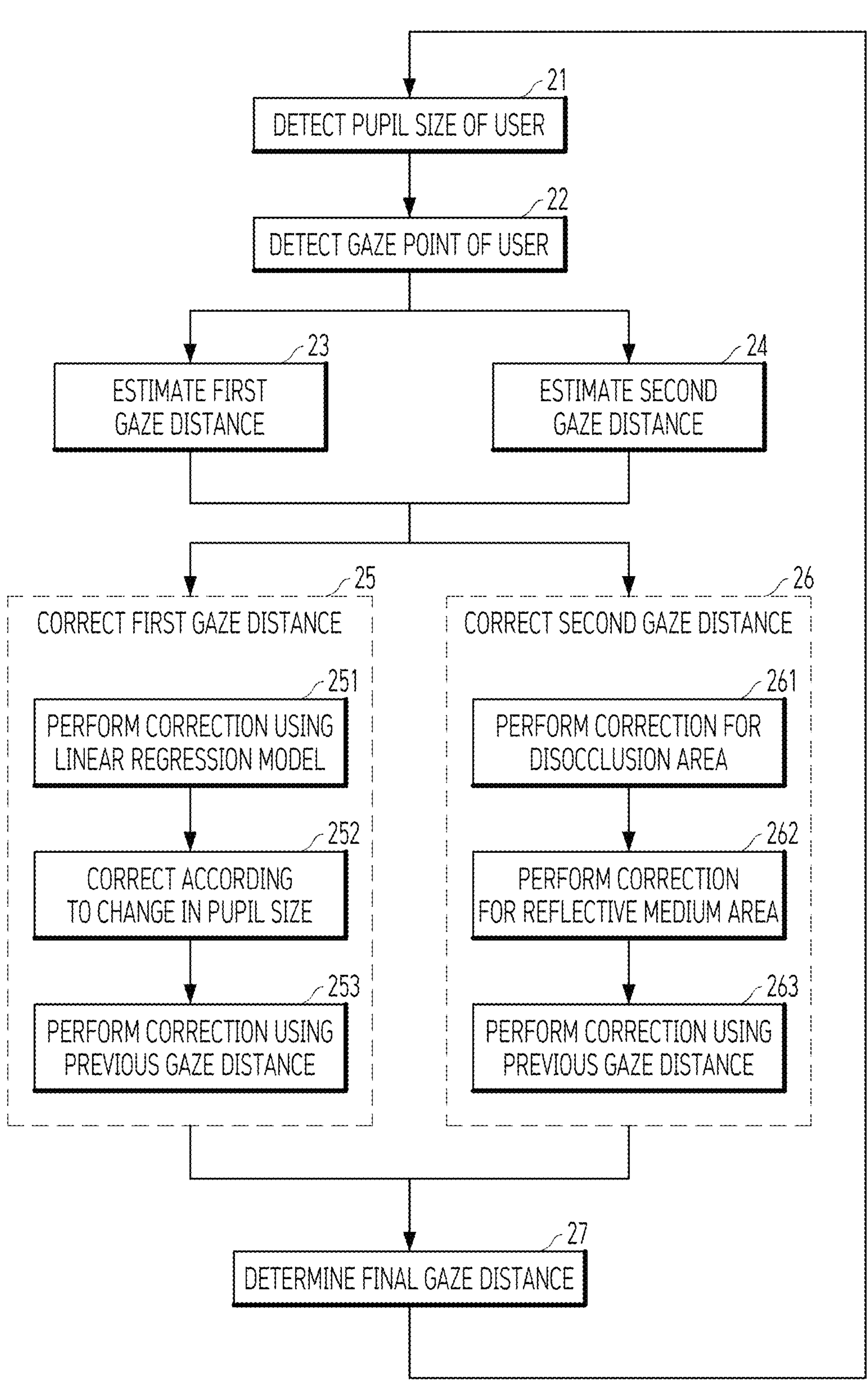
FIG. 2 is a flowchart of a gaze distance estimation method according to an embodiment of the present disclosure.

FIG. 2 is a flowchart of a gaze distance estimation method according to an embodiment of the present disclosure. Referring to FIG. 2, the gaze distance estimation method according to the present embodiment includes step 21 to step 27 performed by the gaze distance estimation device illustrated in FIG. 1. Hereinafter, the pupil size detection unit 10, the gaze point detection unit 20, the first gaze distance estimation unit 30, the second gaze distance estimation unit 40, the first gaze distance correction unit 50, the second gaze distance correction unit 60, and the hybrid estimation unit 70 will be described with reference to FIGS. 1 and 2.

The front camera 1, the depth camera 2, and the binocular cameras 3 and 4 generate front, depth, and binocular images in real time. That is, step 21 to step 27 are repeatedly performed for multiple front images obtained by shooting the environment in front of a field of view of a user at multiple time points by using the front camera 1, multiple depth images obtained by measuring depth values of respective pixels at multiple time points by using the depth camera 2, and each of multiple binocular images obtained by shooting both eyes of the user by using the binocular cameras 3 and 4. The last time point among the multiple time points is a current time point. Hereinafter, unless there is any special description regarding a generation time point of each image and a performance time point of each step, for example, a detection time point, an estimation time point, or so on, the generation time point of each image and the performance time point of each step are the current time point.

In step 21, the pupil size detection unit 10 detects pupil sizes of both eyes of a user from the binocular images generated by the binocular cameras 3 and 4. The binocular images generated by the binocular cameras 3 and 4 are images obtained by shooting both eyes of the user and include a left eye image obtained by shooting a left eye pupil of the user and a right eye image obtained by shooting a right eye pupil of the user. The pupil size detection unit 10 detects contour lines of the left eye pupil and the right eye pupil respectively from the left eye image and the right eye image and measures lengths of a major axis and a minor axis of the contour lines of the left eye pupil and the right eye pupil detected in this way, thereby detecting pupil sizes of both eyes of a user. An average pupil size of the left eye pupil and the right eye pupil may be used as pupil sizes of both eyes, or a pupil size of either the left eye pupil or the right eye pupil may be used as the pupil sizes of both eyes.

In step 22, the gaze point detection unit 20 detects a gaze point of a user in the front image generated by the front camera 1 from the binocular images generated by the binocular cameras 3 and 4. The gaze point detection unit 20 detects a center point of the left eye pupil and a center point of the right eye pupil respectively from the left eye image and the right eye image and determines a point where a normal line of the center point of the left eye pupil and a normal line of the center point of the right eye pupil intersects each other in the front image is detected as a gaze point of the user. Since detecting a gaze point of a user is a technique known to those skilled in the art to which the present embodiment belongs, detailed descriptions thereof are omitted.

In step 23, the first gaze distance estimation unit 30 estimates a first gaze distance between both eyes of a user and the gaze point based on a binocular convergence angle of the user estimated from the binocular images generated by the binocular cameras 3 and 4. The first gaze distance estimation unit 30 detects, as a binocular convergence angle of the user, an angle between the normal line of the center point of the left eye pupil and the normal line of the center point of the right eye pupil shown by the binocular images at a point where the normal line of the center point of the left eye pupil and the normal line of the center point of the right eye pupil intersect with each other in the front image. Subsequently, the first gaze distance estimation unit 30 estimates a first gaze distance by calculating a gaze distance between both eyes of a user and the gaze point from a distance between the center point of the left eye pupil and the center point of the right eye pupil and the binocular convergence angle of the user. The gaze distance calculated in this way is the first gaze distance. In this way, the first gaze distance may be a gaze distance based on a binocular convergence angle of a user.

Figure 3:
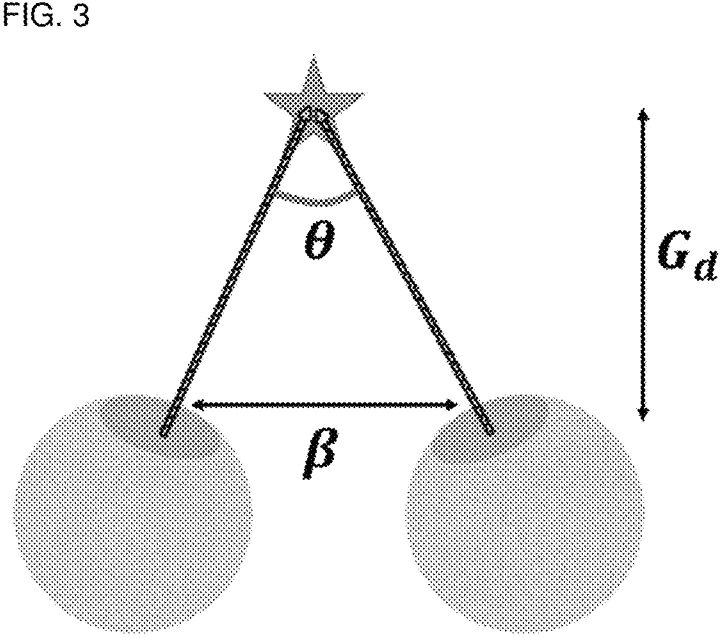
FIG. 3 is a diagram illustrating estimation of a first gaze distance in step 23 illustrated in FIG. 2.

FIG. 3 is a diagram illustrating estimation of the first gaze distance in step 23 illustrated in FIG. 2. From FIG. 3, it can be seen that a first gaze distance Gd is determined when a distance B between the center point of the left eye pupil and the center point of the right eye pupil is determined and the binocular convergence angle $\theta$ of a user is determined. In the estimation of a gaze distance in step 23, there may be a scale error of a gaze distance due to human physiological characteristics such as fatigue, poor concentration, and so on, a gaze distance drift phenomenon due to relaxation of muscles around both eyes, or an error of a gaze distance estimation value due to eye tremors, blinking, fixed gaze point imperfections, or so on. Since estimating the first gaze distance is a technique known to those skilled in the art in the technical field to which the present embodiment belongs, detailed descriptions thereof are omitted.

A distance between the center point of the left eye pupil and the center point of the right eye pupil is inherently different for each user, but 6.5 cm is used as an average distance between human eye pupils in the estimation of the gaze distance in step 23. Also, due to various problems, for example, gaze lines of both eyes not intersecting, such as strabismus, an error occurs at a certain rate between an actual gaze distance and the estimated value of the first gaze distance. This is called a scale error of gaze distance. Even when a user continuously gazes at the same place, muscles around both eyes relax over time, and a convergence angle of both eyes decreases, causing the estimated value of the first gaze distance to increase. This is called a drift phenomenon of a gaze distance.

In step 24, the second gaze distance estimation unit 40 estimates a second gaze distance between both eyes of a user and the gaze point based on a depth value of the gaze point of the user estimated from the depth image generated by the depth camera 2. The second gaze distance estimation unit 40 extracts a depth value of a pixel corresponding to the gaze point of the user detected by the gaze point detection unit 20 in step 22 among depth values of a plurality of pixels shown by the depth image generated by the depth camera 2, determines the extracted depth value as a gaze distance between both eyes of the user and the gaze point, thereby estimating the second gaze distance. The gaze distance determined in this way is the second gaze distance. In this way, the second gaze distance may be a gaze distance based on the depth value of the gaze point of the user.

Figure 4:
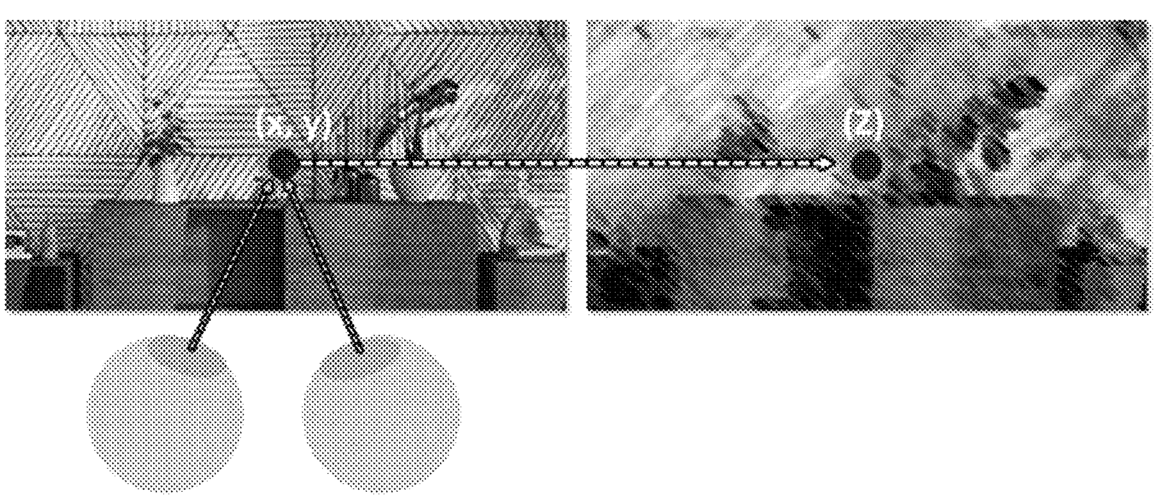
FIG. 4 is a view illustrating estimation of a second gaze distance in step 24 illustrated in FIG. 2.

FIG. 4 is a view illustrating estimation of a second gaze distance in step 24 illustrated in FIG. 2. For example, when a front image, that is a two-dimensional image, has color values of 1024×768 pixels, a depth image has depth values of 1024×768 pixels. A depth value z of a pixel having the same coordinate value (x, y) as a coordinate value (x, y) of a pixel corresponding to a gaze point of a user in the front image is extracted from the depth image. In estimating the gaze distance in step 24, an error of a gaze distance estimation value occurs in an area, in which accurate depth measurement by the depth camera 2 is difficult, such as a disocclusion area, a reflective medium area, or so on. Since the estimation of the second gaze distance is a technique known to those skilled in the art in the technical field to which the present embodiment belongs, detailed descriptions thereof are omitted.

In step 25, the first gaze distance correction unit 50 corrects the first gaze distance estimated by the first gaze distance estimation unit 30 in step 23 based on a linear correlation between the first gaze distance estimated by the first gaze distance estimation unit 30 in step 23 and the second gaze distance estimated by the second gaze distance estimation unit 40 in step 24, a pupil size detected by the pupil size detection unit 10 in step 21, and the first gaze distance estimated by the first gaze distance estimation unit 30 at a time point immediately before the current time point in step 23. As illustrated in FIG. 2, step 21 to step 27 are performed repeatedly. Accordingly, the present embodiment estimates a gaze distance of a user which changes in real time according to a real-time change in the gaze point of the user. Step 25 includes step 251, step 252, and step 253.

Figure 5:
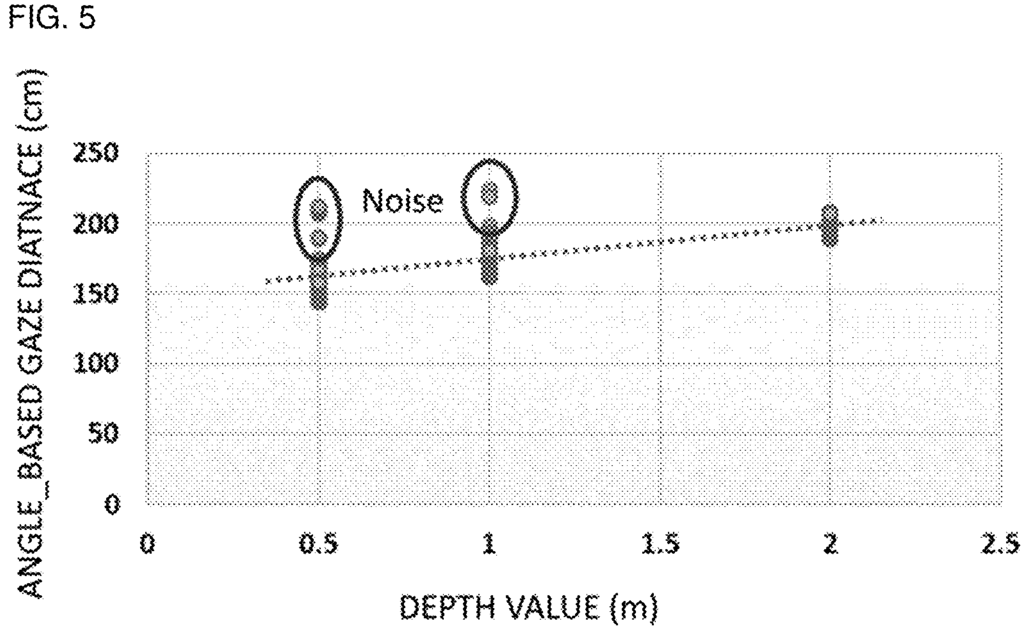
FIG. 5 is a graph illustrating a linear correlation between a first gaze distance estimated in step 23 illustrated in FIG. 2 and a second gaze distance estimated in step 24 illustrated in FIG. 2.

In step 251, the first gaze distance correction unit 50 corrects the first gaze distance estimated in step 23 in a direction that minimizes a scale error of the first gaze distance estimated in step 23 using a linear regression model that reflects the linear correlation between the first gaze distance estimated in step 23 and the second gaze distance estimated in step 24. FIG. 5 is a graph illustrating the linear correlation between the first gaze distance estimated in step 23 and the second gaze distance estimated in step 24 illustrated in FIG. 2. In the graph of FIG. 5, an x axis represents the second gaze distance, that is, an actual gaze distance estimated in step 24 as a depth value of a gaze point of a use measured by the depth camera 2, and a y axis represents the first gaze distance estimated in step 23.

$$\mathcal{D}_X = a_0 + a_1\mathcal{V}_X \quad \text{Equation 1}$$

In Equation 1, "$D_x$" refers to a depth value of a gaze point of a user measured by the depth camera 2, "$V_x$" refers to a value of the first gaze distance estimated in step 23, and a subscript "x" refers to a number of an experimental sample. For example, when the first gaze distance is measured N number of times according to step 23 for N different gaze point samples of a user, and an actual gaze distance is measured N number of times using the depth camera 2, "x={1, 2, 3, . . . , N}".

As illustrated in FIG. 5, it was experimentally confirmed that the first gaze distance estimated in step 23 and the measured actual value are in a linear relationship, and when noise is removed, a linear relationship between the first gaze distance estimated in step 23 and the measure actual value may be represented by a linear equation. That is, coefficients "$a_0$" and "$a_1$" of Equation 1 may be determined from the linear equation illustrated in FIG. 5, and a linear correlation between the first gaze distance estimated in step 23 and the second gaze distance estimated in step 24 may be represented as the coefficients "$a_0$" and "$a_1$" in Equation 1.

$$\mathcal{V} \leftarrow a_0 + a_1\mathcal{V} \quad \text{Equation 2}$$

In Equation 2, "V" refers to a value of the first gaze distance estimated in step 23, and "$a_0$" and "$a_1$" mean linear regression model coefficients. In Equation 2, "←" means that the first gaze distance is updated to the calculated value on the right. The linear regression model coefficients "$a_0$" and "$a_1$" are determined by Equation 1. In this way, in step 251, the first gaze distance correction unit 50 corrects the first gaze distance estimated in step 23 by updating the first gaze distance estimated in step 23 with the value calculated by inserting the first gaze distance estimated in step 23 into the linear regression model of Equation 2. Through this update process, a scale error of the first gaze distance estimated in step 23 may be minimized.

In step 252, the first gaze distance correction unit 50 corrects the first gaze distance estimated in step 23 by updating the first gaze distance estimated in step 23 with a value obtained by applying a weight that changes according to a change between the pupil size detected by the pupil size detection unit 10 at a time point immediately before the current time point in step 21 and the pupil size detected at the current time point in step 21, to the first gaze distance estimated in step 23. In step 252, the first gaze distance correction unit 50 may also correct the first gaze distance corrected in step 251.

In step 252, the first gaze distance correction unit 50 may also correct the first gaze distance corrected in step 251 by updating the first gaze distance corrected in step 251 with a value obtained by applying a weight that changes according to a change between the pupil size detected by the pupil size detection unit 10 at a time point immediately before the current time point in step 21 and the pupil size detected at the current time point in step 21, to the first gaze distance corrected in step 251. Hereinafter, it is described in step 252 that the first gaze distance correction unit 50 corrects the first gaze distance estimated in step 23, but the first gaze distance corrected in step 251 may also be corrected according to a flowchart illustrated in FIG. 2.

Figure 6:
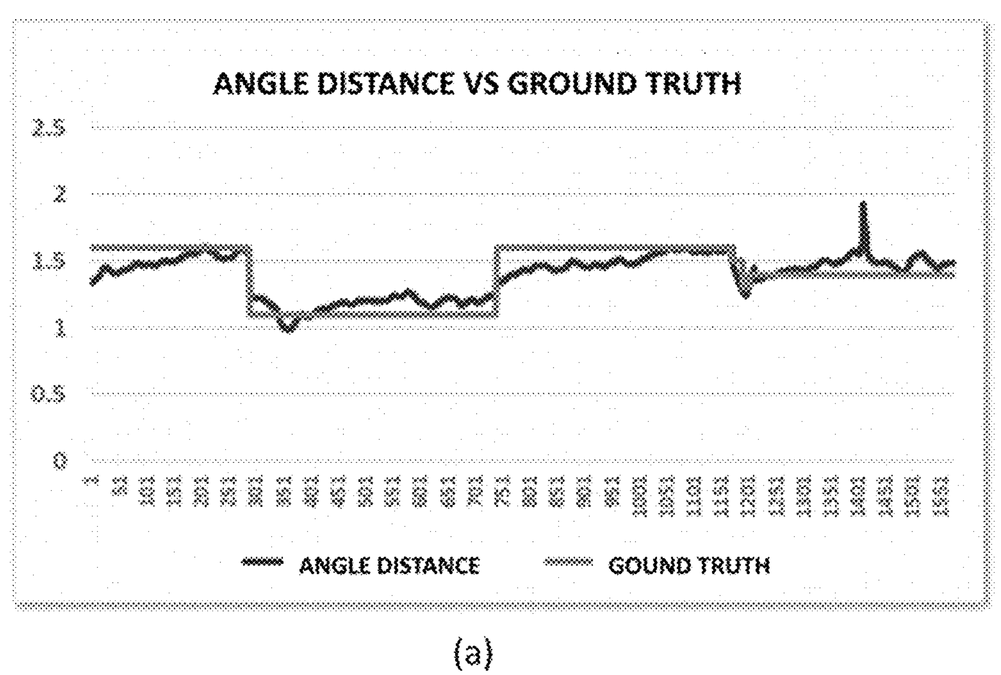
FIG. 6 illustrates graphs of a pupil size expansion tendency when a gaze distance drift phenomenon occurs.
Figure 6:
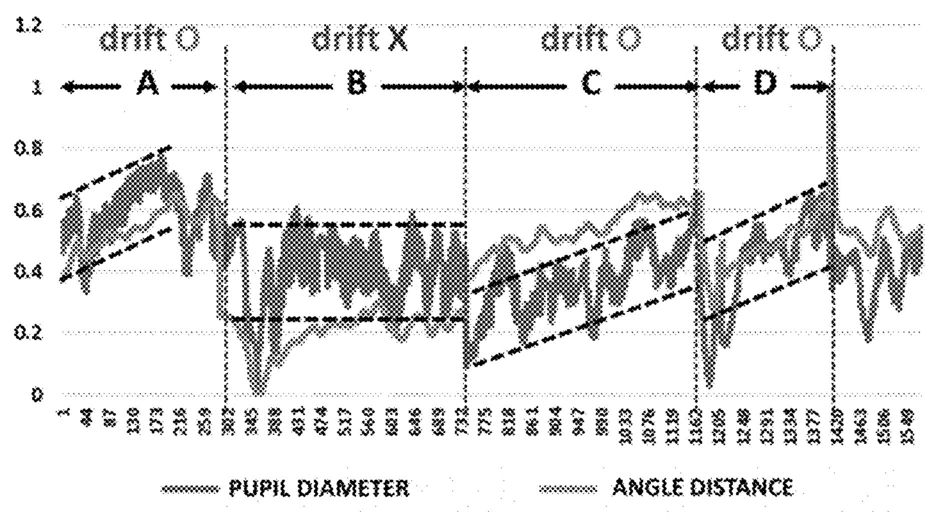

FIG. 6 illustrates graphs of a pupil size expansion tendency when a gaze distance drift phenomenon occurs. The pupil size expansion phenomenon was experimented by using images obtained by shooting both eyes of a user in more than 1,500 frames by the binocular cameras 3 and 4, and FIG. 6 shows results of the experiment. (a) of FIG. 6 is a graph illustrating a comparison between a first gaze distance "angle distance" and a truth value "ground truth" of the first gaze distance over time when a user naturally gazes. In (a) of FIG. 6, numbers on the x axis represent frame numbers of a binocular image, and the y axis represents a gaze distance (m). In the present embodiment, a truth value of the first gaze distance means an actual gaze distance between both eyes of a user and the gaze point measured by the depth camera 2.

(b) of FIG. 6 is a graph illustrating a relationship between the first gaze distance in (a) of FIG. 6 and a pupil size. In (b) of FIG. 6, numbers on the x axis represent frame numbers, and the y axis represents normalized gaze distance and pupil size. After the first gaze distance in (a) of FIG. 6 and the pupil size detected each time the first gaze distance is estimated are normalized to values between 0 and 1, and the normalized values are shown in (b) of FIG. 6. Accordingly, the y axis does not have any units. As a result of the experiment, in (b) of FIG. 6, a drift occurs in sections A, C, and D where the pupil size tends to expand, and no drift occurs in section B where the pupil size does not expand. That is, it can be seen that, when a drift occurs, a pupil size tends to expand due to a pupil's relaxation effect.

Figure 7:
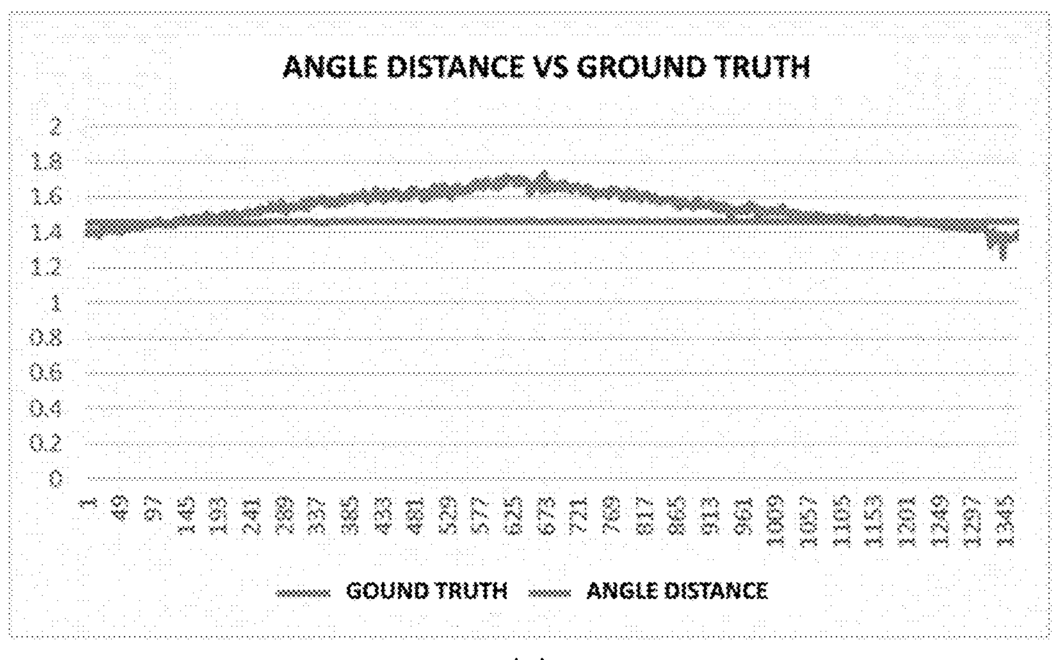
FIG. 7 illustrates graphs showing that a drift phenomenon does not occur when a user focuses his/her gaze on an inclined plane.
Figure 7:
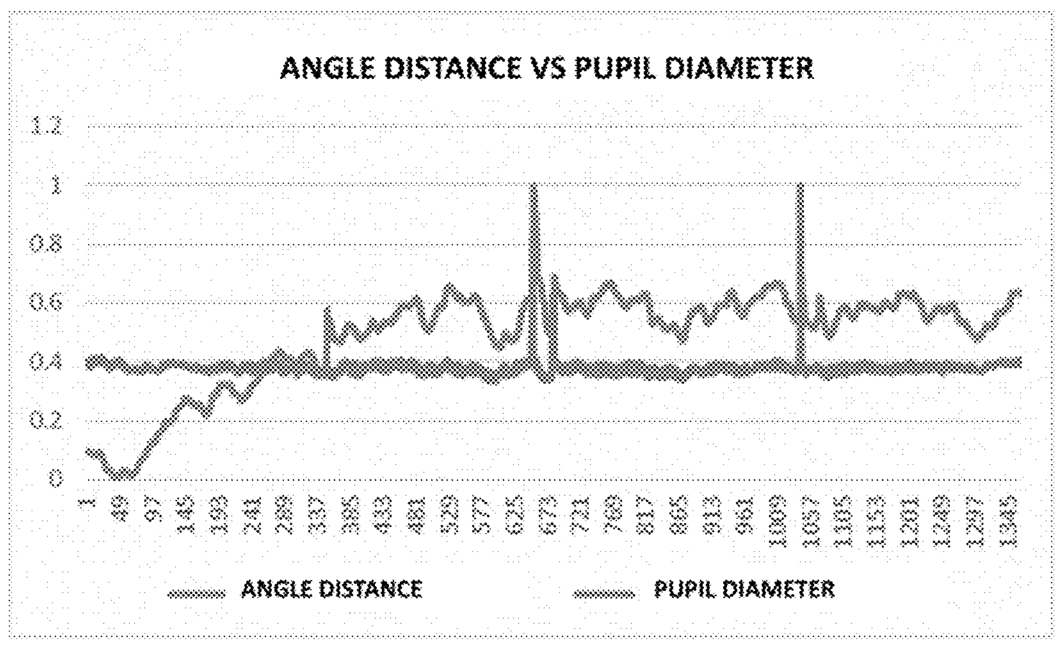

FIG. 7 illustrates graphs in which a drift does not occur when a user focuses his/her gaze on an inclined plane. (a) of FIG. 7 is a graph illustrating a comparison between a first gaze distance "angle distance" and a truth value "ground truth" of the first gaze distance over time when a user focuses his/her gaze on an inclined plane. In (a) of FIG. 7, numbers on the x axis represent frame numbers of a binocular image, and the y axis represents a gaze distance (m). It may be seen from (a) of FIG. 7 that, when a user focuses and moves his/her gaze smoothly, a change in binocular convergence angle is not great in such smooth movement.

(b) of FIG. 7 is a graph illustrating a relationship between the first gaze distance in (a) of FIG. 7 and a pupil size. In (b) of FIG. 7, numbers on the x axis represent frame numbers, and the y axis represents normalized gaze distance and pupil size. Referring to (b) of FIG. 7, it can be seen that it is difficult to find a part, which may be recognized as a drift, from a smooth movement of the gaze in the first gaze distance estimated based on a binocular convergence angle of a user and a change in pupil size is also very small.

In step 252, the first gaze distance correction unit 50 corrects the first gaze distance estimated in step 23 by updating the first gaze distance estimated in step 23 with a value obtained by applying a weight that changes according to a change between the pupil size detected at a time point immediately before the current time point in step 21 and the pupil size detected at the current time point, to the reference gaze distance, which is a gaze distance at a time point when pupils of a user expands after shrinking according to Equation 3 below, and the first gaze distance estimated in step 23.

$$\mathcal{V}_t \leftarrow \mathcal{P}^t_{drift} \cdot \mathcal{V}_{basis} + \left(1 - \mathcal{P}^t_{drift}\right) \cdot \mathcal{V}_t \qquad \text{Equation 3}$$

In Equation 3, "$P^t_{drift}$" refers to a weight for a reference gaze distance according to a change in pupil size at a current time point t, "$V_{basis}$" refers to a value of the reference gaze distance which is a gaze distance at a time point when pupils of a user expand after shrinking, and "$V_t$" refers to a value of the first gaze distance estimated at the current time point t. In step 252, the reference gaze distance $V_{basis}$ and the weight $P^t_{drift}$ are defined based on characteristics that pupils tend to shrink and then expand at a time point when a drift occurs. The changes in pupil size may be classified into four conditions as follows.

$$C1\colon \nabla\mathcal{P}^{t-1}_{size} < 0 \;\&\; \nabla\mathcal{P}^{t}_{size} > 0$$

$$C2\colon \nabla\mathcal{P}^{t-1}_{size} > 0 \;\&\; \nabla\mathcal{P}^{t}_{size} > 0$$

$$C3\colon \nabla\mathcal{P}^{t-1}_{size} > 0 \;\&\; \nabla\mathcal{P}^{t}_{size} < 0$$

$$C4\colon \nabla\mathcal{P}^{t-1}_{size} < 0 \;\&\; \nabla\mathcal{P}^{t}_{size} < 0$$

In the four conditions, "$P^t_{size}$" refers to a normalized pupil size at the current time point t, and "$P^{t-1}_{size}$" refers to a normalized pupil size at a time point t−1 immediately before the current time point. "C1" corresponds to a case where pupils expand after shrinking, "C2" corresponds to a case where the pupils continuously expand, "C3" corresponds to a case where the pupils shrink after expanding, and "C4" corresponds to a case where the pupils continuously shrink.

The weight "$P^t_{drift}$" represents a value obtained by normalizing a degree (0 to 1) of drift in the first gaze distance estimated at the current time point t to a range between 0 and 1. The weight may be defined by Equation 5 below. As illustrated in Equation 4 below, the gaze distance at a time point C1 when pupils expand after shrinking is defined as a reference gaze distance, and when the pupils continuously expand (C2), a weight for the reference gaze distance is increased, and thus, a gaze distance error due to a drift may be minimized. Meanwhile, when pupils shrink after expanding (C3) or the pupils continuously shrink (C4), a weight for the reference gaze distance is maintained.

$$\mathcal{V}_{basis} \leftarrow \mathcal{V}_t \text{ if } C1 \qquad \text{Equation 4}$$

$$\mathcal{P}^t_{drift} = \begin{cases} 0 & \text{if } C1 \\ \sum_{t=T} |\nabla\mathcal{P}^t_{size}| & \text{else if } C2 \\ \mathcal{P}^{t-1}_{drift} & \text{else if } C3, C4 \end{cases} \qquad \text{Equation 5}$$

In step 253, the first gaze distance correction unit 50 corrects the first gaze distance estimated in step 23 by updating the first gaze distance estimated at the current time point with a value obtained by applying a preset weight to the first gaze distance estimated at a time point immediately before the current time point and the first gaze distance estimated at the current time point in step 23 according to Equation 6 below. In step 253, the first gaze distance correction unit 50 may also correct the first gaze distance corrected in step 252 according to the flowchart illustrated in FIG. 2. In this case, the first gaze distance estimated at the time point immediately before the current time point in step 23 is replaced with a correction value at the time point immediately before the current time point in step 252, and the first gaze distance estimated at the current time point in step 23 is replaced with the correction value at the current time point in step 252.

$$\mathcal{V}_t - \omega_{temp} \cdot \mathcal{V}_{t-1} + (1 - \omega_{temp}) \cdot \mathcal{V}_t \quad \text{Equation 6}$$

In Equation 6, "$V_{t-1}$" refers to a value of the first gaze distance estimated at a time point t−1 immediately before the current time point, and "$V_t$" refers to a value of the first gaze distance estimated at the current time point t, "$W_{temp}$" refers to a temporal stability weight. "$W_{temp}$" is previously set by a user according to how much the previously estimated gaze distance is referred to. In this way, the first gaze distance correction unit 50 may correct the first gaze distance by referring to the previous gaze distance in consideration of temporal stability. Accordingly, an error in gaze distance that change momentarily due to noise or so on may be minimized.

In step 26, the second gaze distance correction unit 60 corrects the first gaze distance estimated by the second gaze distance estimation unit 40 in step 23 based on the position of the gaze point detected by the gaze point detection unit 20 in step 22 and the second gaze distance estimated at a time point immediately before the current time point by the second gaze distance estimation unit 40 in step 24. As described above, step 21 to step 27 are repeatedly performed for multiple front images obtained by shooting an environment in front of a field of view of a user at multiple time points by using the front camera 1, multiple depth images obtained by measuring a depth value of each pixel at multiple time points by using the depth camera 2, and each of multiple binocular images obtained by shooting both eyes of the user by using the binocular cameras 3 and 4. Step 26 includes step 261, step 262, and step 263.

In step 261, the second gaze distance correction unit 60 corrects a second gaze distance estimated in step 23 by changing a value of the second gaze distance estimated by the second gaze distance estimation unit 40 in step 24 to a value of the first gaze distance estimated by the first gaze distance estimation unit 30 in step 23 according to whether the gaze point detected by the gaze point detection unit 20 in step 22 is located in a disocclusion area that is an area where a depth value of a gaze point of a user may not be measured due to an object located between both eyes of the user and the gaze point.

In step 261, when a value "$d_{dis}$" determined according to Equation 7 below is "1", that is, when the gaze point detected in step 22 is located in a disocclusion area, the second gaze distance correction unit 60 changes the value of the second gaze distance estimated in step 24 to the value of the first gaze distance estimated in step 23, and when the value "$d_{dis}$" determined according to Equation 7 below is "0", that is, when the gaze point detected in step 22 is not located in the disocclusion area, the value of the second gaze distance estimated in step 24 is maintained as it is.

$$d_{dis} = \begin{cases} 0 & \text{if } \mathcal{D} > 0 \\ 1 & \text{else} \end{cases} \quad \text{Equation 7}$$

In Equation 7, "$d_{dis}$" is a value indicating whether a user is gazing at a disocclusion area, and "D" refers to the value of the second gaze distance estimated in step 24. According to Equation 7, when the value of the second gaze distance estimated in step 24 is greater than 0, "$d_{dis}$" is determined to be 0, otherwise "$d_{dis}$" is determined to be 1. A case where "$d_{dis}$" is determined to be 1 corresponds to a case where the gaze point detected in step 22 is located in the disocclusion area.

In step 262, the second gaze distance correction unit 60 corrects the second gaze distance estimated in step 23 by changing a value of the second gaze distance estimated by the second gaze distance estimation unit 40 in step 24 to a value of the first gaze distance estimated by the first gaze distance estimation unit 30 in step 23 according to whether the gaze point detected by the gaze point detection unit 20 in step 22 is located at a reflective medium area that is an area where a change in depth value of each pixel is greater than or equal to a reference tolerance compared to a change in position of a gaze point of a user in the depth image generated by the depth camera 2.

In step 262, when a value "$d_{ref}$" determined according to Equation 8 below is "1", that is, when the gaze point detected in step 22 is located in a reflective medium area, the second gaze distance correction unit 60 changes the value of the second gaze distance estimated in step 24 to the value of the first gaze distance estimated in step 23, and when the value "$d_{ref}$" determined according to Equation 8 below is "0", that is, when the gaze point detected in step 22 is not located in the reflective medium area, the second gaze distance correction unit 60 maintains the value of the second gaze distance estimated in step 24 as it is.

$$d_{ref} = \begin{cases} 0 & \text{if } \mathcal{F}_{hp}(|\nabla \mathcal{D}|) < d_{error} \\ 1 & \text{else} \end{cases} \quad \text{Equation 8}$$

In Equation 8, the value "$d_{ref}$" is a value indicating whether a user is gazing at a reflective medium, "∇D" refers to a first-order differential value for a waveform of the second gaze distance estimated in step 24, "$F_{hp}$ ( ) refers to a value obtained by high-frequency-filtering the value of ( ) and "$d_{error}$" refers to a reference tolerance. The reference tolerance is set previously according to a depth value tolerance for each depth camera 2 used to generate a depth image.

According to Equation 8, the second gaze distance correction unit 60 performs a first-order differentiation of a waveform of the second gaze distance repeatedly estimated in step 24 during a preset sampling interval by using a digital differentiator under the condition that a change range of a gaze point of a user is within a preset range, and filters the first-order-differentiated value using a high-frequency filter. In this way, when the filtered value is less than "$d_{error}$", "$d_{ref}$" is determined to be 0, otherwise, "$d_{ref}$" is determined to be 1. A case where "$d_{ref}$" is set to 1 corresponds to a case where the gaze point detected in step 22 is located in the reflective medium area.

Figure 8:
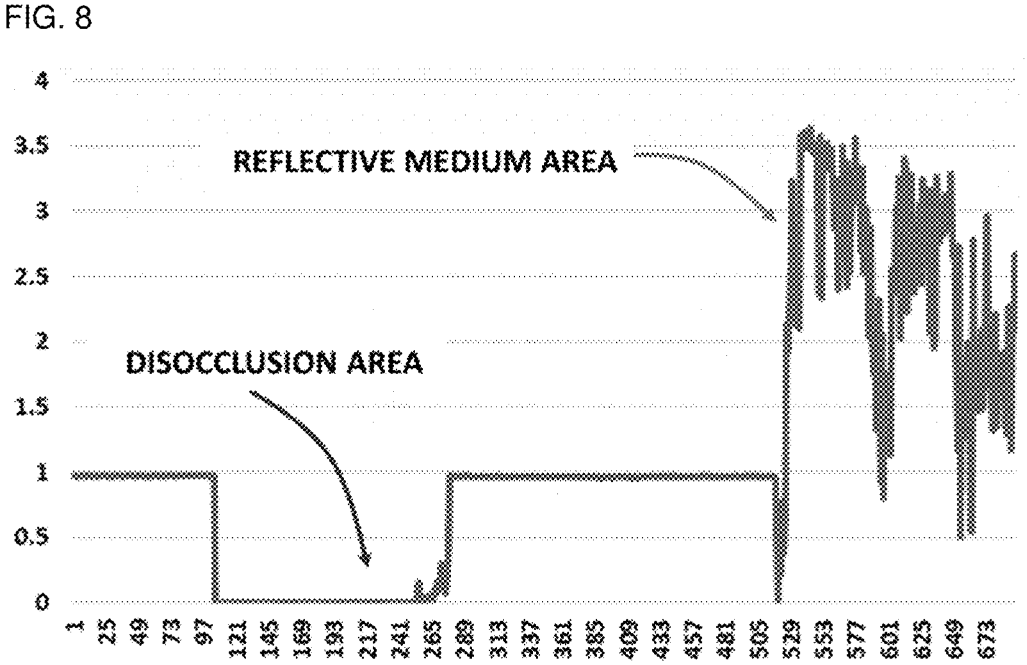
FIG. 8 is a graph illustrating a gaze distance measured by using a depth camera when a user gazes at a disocclusion area or a reflective medium area.

FIG. 8 is a graph illustrating a gaze distance measured by using the depth camera 2 when a user gazes at a disocclusion area or a reflective medium area. In FIG. 8, numbers on the x axis represent frame numbers of a binocular image, and the y axis represents a gaze distance (m) measured by using the depth camera 2 for each frame. Referring to FIG. 8, it can be seen that a gaze distance is measured as 0 when the gaze point of a user is located in a disocclusion area. In addition, it can be seen that a gaze distance changes significantly with a large amplitude even when there is little change in the gaze point of the user in a case where the gaze point of the user is located in the reflective medium area.

In step 263, the second gaze distance correction unit 60 corrects the second gaze distance estimated in step 24 by updating the second gaze distance estimated at the current time point with the value obtained by applying a preset weight to the second gaze distance estimated at a time point immediately before the current time point in step 24 and the second gaze distance estimated at the current time point in step 24 according to Equation 9 below. In step 263, the second gaze distance correction unit 60 may also correct the second gaze distance corrected in step 261 or step 262 according to the flowchart illustrated in FIG. 2. In this case, the second gaze distance estimated at the time point immediately before the current time point in step 24 is replaced with the correction value at the time point immediately before the current time point in step 261 or step 262, and the second gaze distance estimated at the current time point in step 24 is replaced by the correction value at the current time point in step 261 or step 262.

$$\mathcal{D}_t \leftarrow \omega_{temp} \cdot \mathcal{D}_{t-1} + (1 - \omega_{temp}) \cdot \mathcal{D}_t \qquad \text{Equation 9}$$

In Equation 9, "$D_{t-1}$" refers to a value of the second gaze distance estimated at a time point t−1 immediately before the current time point, and "Di" refers to the second gaze distance estimated at the current time point t, and "$W_{temp}$" refers to a temporal stability weight. "$W_{temp}$" is previously set by a user according to how much the previously estimated gaze distance is referred to. In this way, the second gaze distance correction unit 60 may correct the second gaze distance by referring to the previous gaze distance in consideration of temporal stability. Accordingly, an error in gaze distance that changes momentarily due to noise or so on may be minimized.

In step 27, the hybrid estimation unit 70 determines a final gaze distance between both eyes of a user and a gaze point based on the first gaze distance corrected by the first gaze distance correction unit 50 in step 25 and the second gaze corrected by the second gaze distance correction unit 60 in step 26. The hybrid estimation unit 70 determines the final gaze distance based on a value calculated by applying reliability of the first gaze distance to the first gaze distance corrected in step 25 and applying reliability of the second gaze distance to the second gaze distance corrected in step 26 according to Equation 10 below.

$$d_{gaze} = \omega_v \cdot \mathcal{V} + \omega_d \cdot \mathcal{D} \qquad \text{Equation 10}$$

In Equation 10, "$d_{gaze}$" refers to a value of the final gaze distance determined in step 27, "V" refers to a value of the first gaze distance corrected in step 25, and "D" refers to a value of the second gaze distance corrected in step 26. "$w_v$" refers to reliability of the first gaze distance, and "$w_d$" refers to reliability of the second gaze distance. That is, the hybrid estimation unit 70 determines the final gaze distance by adding together a value obtained by multiplying the first gaze distance corrected in step 25 by the reliability of the first gaze distance and a value obtained by multiplying the second gaze distance corrected in step 26 by the reliability of the second gaze distance.

In this way, the present embodiment may accurately estimate a gaze distance of a user robustly against a difference in physiological characteristics of the user and a change in external environment using information of a binocular image and information of a depth image in a complementary manner. This was derived from the idea that, when a person estimates a gaze distance, a more accurate and stable gaze distance may be estimated by cross-referencing a binocular convergence control cue and a focus control cue in a human visual system and was designed as a gaze distance estimation framework having a dual feedback structure such that information of a binocular image and information of a depth image complement each other.

The reliability of the first gaze distance and the reliability of the second gaze distance are determined according to whether the gaze point detected in step 22 is located in a disocclusion, which is an area where a depth value of a gaze point of a user may not be measured due to an object located between both eyes of the user and the gaze point, or a reflective medium area, which is an area where a change in depth value of each pixel in a depth image is greater than or equal to a reference tolerance compared to a change in position of the gaze point of the user, by using Equation 11 below.

$$\omega_v = \frac{\mathcal{V}_S}{\mathcal{V}_S + d_s \cdot (1 - d_{dis}) \cdot (1 - d_{ref})},\ \omega_d = 1 - \omega_v \qquad \text{Equation 11}$$

In Equation 11, when a gaze point of a user is located in a disocclusion area, it is determined to be $d_{dis}=1$, and when the gaze point is not located in the disocclusion area, it is determined to be $d_{dis}=0$. Also, when the gaze point of the user is located in a reflective medium area, it is determined to be $d_{ref}=1$, and when the gaze point is not located in the reflective medium area, it is determined to be $d_{ref}=0$. It may be seen from Equation 11 that the reliability of the first gaze distance is a value between 0 and 1, and the reliability of the second gaze distance is a value obtained by subtracting the reliability of the first gaze distance from 1.

"$v_s$" in Equation 11 refers to stability of the first gaze distance corrected in step 25, and "$d_s$" refers to stability of the second gaze distance corrected in step 26. The stability of the first gaze distance and the stability of the second gaze distance are values indicating how stably a user gazes at the same point, and are calculated by Equation 12 below.

$$\mathcal{V}_S = 1 - \nabla\mathcal{V},\ d_s = 1 - \nabla\mathcal{D} \qquad \text{Equation 12}$$

In Equation 11, "∇V" and "∇D" refer to values obtained by normalizing the amount of change in the correction value of the first gaze distance repeatedly calculated in step 25 during a preset sampling period and the amount of change in the correction value of the second gaze distance repeatedly calculated in step 26 to a range of 0 to 1 for the first gaze distance V and the second gaze distance D. As the change in position of a gaze point of a user is reduced during a sampling period, "∇V" and "∇D" are reduced, and "$v_s$" and "$d_s$" increase.

That is, the reliability of the first gaze distance and the reliability of the second gaze distance may be determined according to the amount of change between the first gaze distances repeatedly estimated in step 23 and the amount of change between the second gaze distances repeatedly estimated in step 24. In this way, the hybrid estimation unit 70 may accurately estimate a gaze distance of a user by minimizing an error due to human physiological characteristics in addition to a sensing error of the depth camera 2 due to a gaze point of a user being located in a disocclusion area or a reflective medium area.

Meanwhile, the method of estimating a gaze distance of a user according to an embodiment of the present disclosure described above may be implemented by a program executable on a processor of a computer and may be implemented on a computer that records and executes the program on a computer-readable recording medium. The computer includes all types of computers that may execute programs, such as a desktop computer, a notebook computer, a smartphone, and an embedded-type computer. In addition, a structure of the data used in one embodiment of the present disclosure described above may be recorded on a computer-readable recording medium through various means. The computer-readable recording medium includes a storage, such as random access memory (RAM), read only memory (ROM), a solid state drive (SSD), a magnetic storage medium (for example, a floppy disk, a hard disk, or so on), or an optical reading medium (for example, compact disk (CD)-ROM, a digital video disk (DVD), or so on).

A gaze distance of a user may be accurately estimated robustly against a difference in physiological characteristics of the user and a change in external environment using information of a binocular image and information of a depth image in a complementary manner by determining a final gaze distance of the user based on a first gaze distance of the user estimated based on a binocular convergence angle of the user and a second gaze distance of the user estimated based on a depth value of the gaze point of the user. That is, by complementing the limitations of the known gaze distance estimation technology using a binocular convergence angle of a user and the known gaze distance estimation technology using a depth camera, a gaze distance of a user may be accurately estimated robustly against a difference in physiological characteristics of the user and a change in external environment.

A gaze distance estimation error due to human physiological characteristics, such as eye blinking and pupil relaxation, and a gaze distance estimation error due to a depth value error of a depth camera caused by a gaze point of a user being located in a disocclusion area, a reflective medium, or so on may be minimized, and as a result, the gaze distance of the user may be accurately estimated. Also, the present disclosure may be applied to any wearable device that may obtain a gaze point of a user and a depth image, such as AR glasses, and accordingly, information of a gaze distance of a user may be stably provided without limitations from the external environment. The present disclosure is not limited to the effects described above, and other effects may be derived from following descriptions.

Herein, preferred embodiments of the present disclosure are described. Those skilled in the art to which the present disclosure belongs will be able to understand that the present disclosure may be implemented in a modified form without departing from the essential characteristics of the present disclosure. Therefore, the disclosed embodiments should be considered from an illustrative point of view rather than a restrictive point of view. The scope of the present disclosure is represented in the claims rather than the above description, and all differences within the equivalent scope will be construed as being included in the present disclosure.

What is claimed is:

1. A method of estimating a gaze distance of a user, the method comprising:

detecting a gaze point of the user in a front image, which is an image of an environment in front of a field of view of the user, from a binocular image, which is an image of both eyes of the user;

estimating a first gaze distance between both eyes of the user and the gaze point based on a binocular convergence angle of the user estimated from the binocular image;

estimating a second gaze distance between the both eyes of the user and the gaze point based on a depth value of the gaze point of the user estimated from a depth image of the environment in front of the field of view of the user;

correcting the estimated first gaze distance based on a linear correlation between the estimated first gaze distance and the estimated second gaze distance, wherein the estimated first gaze distance is corrected in a direction that a scale error of the first gaze distance is minimized using a linear regression model reflecting the linear correlation between the estimated first gaze distance and the estimated second gaze distance; and determining a final gaze distance between the both eyes of the user and the gaze point based on the corrected first gaze distance and the second gaze distance.

2. The method of claim 1, wherein, in the estimating of the first gaze distance, the first gaze distance is estimated by detecting an angle between a normal line of a center point of a left eye pupil and a normal line of a center point of a right eye pupil shown in the binocular image as binocular convergence of the user, and calculating a gaze distance between the both eyes of the user and the gaze point from a distance between the center point of the left eye pupil and the center point of the right eye pupil and the detected binocular convergence angle.

3. The method of claim 1, wherein in the estimating of the second gaze distance, the second gaze distance is estimated by extracting a depth value of a pixel corresponding to the detected gaze point of the user from among depth values of a plurality of pixels shown in the depth image, and determining the extracted depth value as a gaze distance between the both eyes of the user and the gaze point.

4. The method of claim 1, further comprising:

detecting a pupil size of the user from the binocular image; and correcting the corrected first gaze distance based on the detected pupil size, wherein, in the determining of the final gaze distance, the final gaze distance is determined based on the first gaze distance corrected based on the linear correlation and the pupil size.

5. The method of claim 4, wherein the detecting of the pupil size, the detecting of the gaze point, the estimating of the first gaze distance, the estimating of the second gaze distance, and the determining of the final gaze distance are performed repeatedly for each of a plurality of binocular images obtained by shooting both eyes of the user at multiple time points, and wherein in the correcting of the first gaze distance, the first gaze distance is corrected by updating the estimated first gaze distance with a value obtained by applying a weight that changes according to a change between a pupil size detected at a time point immediately before a current time point, which is a last time point among the plurality of time points, and a pupil size detected at the current time point, to the estimated first gaze distance.

6. The method of claim 5, wherein, in the correcting of the first gaze distance, the first gaze distance is corrected by updating the estimated first gaze distance with a value obtained by applying the weight to a reference gaze distance, which is a gaze distance at a time point when a pupil of the user expands after shrinking, and the estimated first gaze distance.

7. The method of claim 1, wherein the detecting of the gaze point of the user, the estimating of the first gaze distance, the estimating of the second gaze distance, and the determining of the final gaze distance are performed repeatedly for each of a plurality of binocular images obtained by shooting both eyes of the user at multiple time points, and wherein the method further comprises correcting the first gaze distance estimated at a current time point which is a last time point among the multiple time points, based on a first gaze distance estimated at a time point immediately before the current time point and, wherein in the determining the final gaze distance, the final gaze distance is determined based on the corrected first gaze distance.

8. The method of claim 7, wherein, in the correcting of the first gaze distance, the first gaze distance is corrected by updating the estimated first gaze distance with a value obtained by applying a preset weight to the first gaze distance estimated at the time point immediately before the current time point and the estimated first gaze distance.

9. The method of claim 1, further comprising:

correcting the estimated second gaze distance based on a position of the detected gaze point, and in the determining of the final gaze distance, the final gaze distance is determined based on the corrected second gaze distance.

10. The method of claim 9, wherein in the correcting of the second gaze distance, the estimated second gaze distance is corrected by changing a value of the second gaze distance to a value of the estimated first gaze distance according to whether the detected gaze point is located in a disocclusion area which is an area where the depth value of the gaze point of the user is not measured due to an object located between the both eyes of the user and the gaze point.

11. The method of claim 9, wherein, in the correcting of the second gaze distance, the estimated second gaze distance is corrected by changing a value of the estimated second gaze distance to a value of the estimated first gaze distance according to whether the detected gaze point is located in a reflective medium area which is an area where a change in depth value of each pixel in the depth image is greater than or equal to a reference tolerance compared to a change in position of the gaze point of the user.

12. The method of claim 9, wherein the detecting of the gaze point of the user, the estimating of the first gaze distance, the estimating of the second gaze distance, and the determining of the final gaze distance are performed repeatedly for each of a plurality of binocular images obtained by shooting both eyes of the user at multiple time points, and wherein in the correcting of the second gaze distance, the second gaze distance estimated at a current time point which is a last time point among the multiple time points, is corrected based on the second gaze distance estimated at a time point immediately before the current time point.

13. The method of claim 12, wherein, in the correcting of the second gaze distance, the estimated second gaze distance is corrected by updating the estimated second gaze distance with a value obtained by applying a preset weight to the second gaze distance estimated at the time point immediately before the current time point and the second gaze distance estimated at the current time point.

14. The method of claim 1, wherein, in the determining of the final gaze distance, the final gaze distance is determined based on a value calculated by applying reliability of the first gaze distance to the first gaze distance and a value calculated by applying reliability of the second gaze distance to the second gaze distance.

15. The method of claim 14, wherein the reliability of the first gaze distance and the reliability of the second gaze distance are determined according to whether the detected gaze point is located in a disocclusion area, which is an area where the depth value of the gaze point of the user is not measured due to an object located between the both eyes of the user and the gaze point, or a reflective medium area, which is an area where a change in depth value of each pixel in the depth image is greater than or equal to a reference tolerance compared to a change in position of the gaze point of the user.

16. The method of claim 14, wherein the detecting of the gaze point of the user, the estimating of the first gaze distance, the estimating of the second gaze distance, and the determining of the final gaze distance are performed repeatedly for each of a plurality of binocular images obtained by shooting both eyes of the user at multiple time points, and wherein the reliability of the first gaze distance and the reliability of the second gaze distance are determined according to an amount of change between the repeatedly estimated first gaze distances and an amount of change between the repeatedly estimated second gaze distances.

17. A non-transitory computer-readable recording medium in which a program for performing the method of claim 1 using a computer is recorded.

18. A device for estimating a gaze distance of a user, the device comprising:

a gaze point detection unit configured to detect a gaze point of the user in a front image, which is an image of an environment in front of a field of view of the user, from a binocular image, which is an image of both eyes of the user;

a first gaze distance estimation unit configured to estimate a first gaze distance between both eyes of the user and the gaze point based on a binocular convergence angle of the user estimated from the binocular image;

a second gaze distance estimation unit configured to estimate a second gaze distance between the both eyes of the user and the gaze point based on a depth value of the gaze point of the user estimated from a depth image of the front of the field of view of the user;

a first gaze distance correction unit configured to correct the estimated first gaze distance based on a linear correlation between the estimated first gaze distance and the estimated second gaze distance by using a linear regression model reflecting the linear correlation to minimize a scale error of the first gaze distance; and a hybrid estimation unit configured to determine a final gaze distance between the both eyes of the user and the detected gaze point based on the corrected first gaze distance and the second gaze distance.

* * * * *